(12) United States Patent
Blendea et al.

(10) Patent No.: US 12,338,812 B2
(45) Date of Patent: Jun. 24, 2025

(54) PUMP NOISE ATTENUATOR AND METHOD THEREOF

(71) Applicant: LEGGETT & PLATT CANADA CO., Halifax (CA)

(72) Inventors: Horia Blendea, LaSalle (CA); Guilherme Hartenberg Watson, LaSalle (CA); Paul Tindall, Harrow (CA); Robert J. McMillen, Tecumseh (CA)

(73) Assignee: LEGGETT & PLATT CANADA CO., Halifax (CA)

( * ) Notice: Subject to any disclaimer, the term of this patent is extended or adjusted under 35 U.S.C. 154(b) by 141 days.

(21) Appl. No.: 17/755,510

(22) PCT Filed: Oct. 30, 2020

(86) PCT No.: PCT/CA2020/000124
§ 371 (c)(1),
(2) Date: Apr. 29, 2022

(87) PCT Pub. No.: WO2021/081622
PCT Pub. Date: May 6, 2021

(65) Prior Publication Data
US 2022/0381238 A1     Dec. 1, 2022

Related U.S. Application Data

(60) Provisional application No. 63/014,808, filed on Apr. 24, 2020, provisional application No. 62/929,577, filed on Nov. 1, 2019.

(51) Int. Cl.
*F04B 53/00*     (2006.01)
*F04B 39/00*     (2006.01)
(Continued)

(52) U.S. Cl.
CPC ........ *F04B 53/002* (2013.01); *F04B 39/0055* (2013.01); *F04B 39/121* (2013.01);
(Continued)

(58) Field of Classification Search
CPC .. F04B 53/002; F04B 39/0055; F04B 39/121; F04B 39/123; F04B 45/047; F04B 53/001; F04B 53/16
See application file for complete search history.

(56) References Cited

U.S. PATENT DOCUMENTS 3,199,774 A * 8/1965 Lowell ................ F04D 29/5806
                                                                                                           310/63
3,203,447 A    8/1965 Bremner et al.
(Continued)

FOREIGN PATENT DOCUMENTS

CN         2526615 Y     12/2002
CN       103991396 A      8/2014
(Continued)

OTHER PUBLICATIONS

European Patent Office Extended Search Report for Application No. 20882512.5 dated Jan. 5, 2024 (14 pages).
Chinese Patent Office Action for Application No. 202080076057.3 dated Dec. 22, 2023 (28 pages including English translation).
G.RAU Innovative Metalle, "Thermal Actuators", 12 pages, retrieved Apr. 7, 2019.
(Continued)

*Primary Examiner* — Bryan M Lettman
(74) *Attorney, Agent, or Firm* — Michael Best & Friedrich LLP

(57) ABSTRACT

A pump assembly includes a pneumatic pump with a pump body having a discharge passage. The pump is operable to discharge compressed air through the discharge passage. The pump assembly also includes a cap adjacent the pump body and at least partially enclosing a first volume in communication with the discharge passage, and a casing at least partially surrounding the pump. The pump assembly further includes a second volume defined between the casing
(Continued)

and the cap, the second volume in fluid communication with the first volume via an opening in the cap, and a casing outlet in fluid communication with the second volume. The pump assembly is configured such that the compressed air flows through the first volume and the second volume before being discharged from the casing through the casing outlet.

25 Claims, 10 Drawing Sheets

(51) Int. Cl.
   *F04B 39/12* (2006.01)
   *F04B 45/047* (2006.01)
   *F04B 53/16* (2006.01)

(52) U.S. Cl.
   CPC .......... *F04B 39/123* (2013.01); *F04B 45/047* (2013.01); *F04B 53/001* (2013.01); *F04B 53/16* (2013.01)

(56) References Cited

U.S. PATENT DOCUMENTS

| | | | |
|---|---|---|---|
| 3,442,483 A | 5/1969 | Schwartz | |
| 4,115,039 A * | 9/1978 | Schjelde | F04B 39/123 417/363 |
| 4,529,214 A | 7/1985 | Stoll et al. | |
| 4,548,041 A | 10/1985 | Taylor | |
| 4,630,799 A | 12/1986 | Nolan et al. | |
| 4,674,398 A | 6/1987 | Taylor | |
| 4,697,612 A | 10/1987 | Kleineberg et al. | |
| 4,903,732 A | 2/1990 | Allen | |
| 4,922,965 A | 5/1990 | Meister | |
| 4,973,024 A | 11/1990 | Homma | |
| 5,148,833 A | 9/1992 | Ota | |
| 5,211,371 A | 5/1993 | Coffee | |
| 6,098,000 A | 8/2000 | Long et al. | |
| 6,132,183 A * | 10/2000 | Li | F04C 29/066 417/363 |
| 6,135,726 A * | 10/2000 | Robertson | F01C 21/007 417/363 |
| 6,203,105 B1 | 3/2001 | Rhodes, Jr. | |
| 6,499,509 B2 | 12/2002 | Berger et al. | |
| 7,331,773 B2 | 2/2008 | Nawa | |
| 7,744,059 B2 | 6/2010 | Jerg | |
| 7,815,161 B2 | 10/2010 | Saitoh et al. | |
| 8,499,779 B2 | 8/2013 | Gillespie | |
| 8,629,745 B2 | 1/2014 | Sturman et al. | |
| 8,784,080 B2 * | 7/2014 | Dorfler | B60N 2/66 417/440 |
| 8,794,707 B2 | 8/2014 | Bocsanyi et al. | |
| 9,186,853 B2 | 11/2015 | Khan et al. | |
| 9,797,521 B1 | 10/2017 | Davis | |
| 9,945,490 B2 | 4/2018 | Dankbaar et al. | |
| 9,951,765 B2 | 4/2018 | Ki et al. | |
| 10,066,756 B2 | 9/2018 | Sohn | |
| 10,107,279 B2 | 10/2018 | Dankbaar et al. | |
| 10,107,410 B2 | 10/2018 | Dankbaar et al. | |
| 10,207,619 B2 | 2/2019 | Dankbaar et al. | |
| 10,290,876 B2 | 5/2019 | Prieto et al. | |
| 10,378,677 B2 | 8/2019 | Kuszneruk et al. | |
| 10,753,494 B2 | 8/2020 | Beuschel et al. | |
| 10,948,097 B2 | 5/2021 | Dorfler et al. | |
| 11,073,219 B2 | 7/2021 | Dorfler et al. | |
| 11,287,456 B2 | 3/2022 | Wang et al. | |
| 11,422,169 B2 | 8/2022 | Ferraro et al. | |
| 2002/0112788 A1 | 8/2002 | Tanaka et al. | |
| 2003/0178074 A1 | 9/2003 | Itzhaky | |
| 2005/0005980 A1 | 1/2005 | Eberhardt et al. | |
| 2005/0053487 A1 * | 3/2005 | Munker | F04B 23/021 417/363 |
| 2005/0139610 A1 | 6/2005 | Crossdale et al. | |
| 2006/0034707 A1 | 2/2006 | Thomas et al. | |
| 2006/0034708 A1 | 2/2006 | Thomas et al. | |
| 2007/0023089 A1 | 2/2007 | Beyerlein et al. | |
| 2007/0140879 A1 | 6/2007 | Huang | |
| 2007/0237653 A1 | 10/2007 | Wang | |
| 2007/0237654 A1 | 10/2007 | Kasuya et al. | |
| 2008/0271559 A1 | 11/2008 | Garscha et al. | |
| 2010/0139785 A1 | 6/2010 | Saitoh et al. | |
| 2010/0226805 A1 * | 9/2010 | Kulmer | F04B 39/123 417/437 |
| 2011/0095216 A1 | 4/2011 | Degreef et al. | |
| 2012/0067430 A1 | 3/2012 | Deperraz et al. | |
| 2012/0143108 A1 | 6/2012 | Bocsanyi et al. | |
| 2012/0153043 A1 | 6/2012 | Arekar et al. | |
| 2012/0199768 A1 | 8/2012 | Love et al. | |
| 2013/0064689 A1 * | 3/2013 | White | F04B 35/04 417/313 |
| 2014/0103232 A1 | 4/2014 | Deperraz | |
| 2014/0232155 A1 | 8/2014 | Bocsanyi et al. | |
| 2015/0028234 A1 | 1/2015 | Kraus et al. | |
| 2016/0018016 A1 | 1/2016 | Dankbaar et al. | |
| 2016/0153575 A1 | 6/2016 | Sohn | |
| 2016/0207075 A1 | 7/2016 | Alexander et al. | |
| 2017/0298913 A1 | 10/2017 | Kim et al. | |
| 2018/0023906 A1 | 1/2018 | Tajiri et al. | |
| 2018/0038514 A1 | 2/2018 | Kusneruk et al. | |
| 2018/0119686 A1 * | 5/2018 | Shakal | F04B 39/0044 |
| 2018/0135615 A1 | 5/2018 | Snyder et al. | |
| 2018/0283571 A1 | 10/2018 | Miyazoe et al. | |
| 2018/0306212 A1 | 10/2018 | Weickel et al. | |
| 2018/0363642 A1 | 12/2018 | Salih et al. | |
| 2019/0003609 A1 | 1/2019 | Asai et al. | |
| 2019/0107214 A1 | 4/2019 | Kruppe et al. | |
| 2019/0116681 A1 | 4/2019 | De Carolis et al. | |
| 2019/0118690 A1 | 4/2019 | Beuschel et al. | |
| 2019/0120402 A1 | 4/2019 | Jamison et al. | |
| 2019/0195246 A1 | 6/2019 | Jamison et al. | |
| 2019/0353268 A1 | 11/2019 | Dorfler et al. | |
| 2019/0353270 A1 | 11/2019 | Dorfler et al. | |
| 2020/0088314 A1 | 3/2020 | Samain et al. | |
| 2020/0378516 A1 | 12/2020 | Beuschel et al. | |
| 2020/0378527 A1 | 12/2020 | Stephan et al. | |
| 2021/0018109 A1 | 1/2021 | Beuschel et al. | |
| 2022/0106955 A1 | 4/2022 | Auernhammer et al. | |
| 2022/0205551 A1 | 6/2022 | Nicola et al. | |
| 2022/0243827 A1 | 8/2022 | Nicola et al. | |
| 2022/0372969 A1 | 11/2022 | Hines | |

FOREIGN PATENT DOCUMENTS

| | | |
|---|---|---|
| CN | 105465090 A | 4/2016 |
| CN | 108953683 A | 12/2018 |
| CN | 109318770 A | 2/2019 |
| CN | 110030180 A | 7/2019 |
| DE | 19545011 A1 | 4/1997 |
| DE | 19718169 A1 | 11/1998 |
| DE | 10063478 A1 | 7/2002 |
| DE | 102005060217 A1 | 7/2006 |
| DE | 102006053147 A1 | 5/2007 |
| DE | 102011100327 B3 | 8/2012 |
| DE | 102013208820 A1 | 11/2014 |
| DE | 202014006875 U1 | 12/2014 |
| DE | 102015201534 B3 | 4/2016 |
| DE | 102014225756 A1 | 6/2016 |
| DE | 102016225519 A1 | 6/2018 |
| DE | 102017204662 B3 | 7/2018 |
| DE | 102017107073 A1 | 10/2018 |
| DE | 102017217213 B3 | 3/2019 |
| DE | 102018200635 A1 | 7/2019 |
| DE | 202020107139 U1 | 3/2021 |
| EP | 0423045 A1 | 4/1991 |
| EP | 1619287 A1 | 1/2006 |
| EP | 1909008 A1 | 4/2008 |
| EP | 1988440 A1 | 11/2008 |
| EP | 2078891 A2 | 7/2009 |
| EP | 2740521 A1 | 6/2014 |
| EP | 2860401 A2 | 4/2015 |
| EP | 3343078 A1 | 7/2018 |
| GB | 830393 A | 3/1960 |
| GB | 830394 A | 3/1960 |

(56) References Cited

FOREIGN PATENT DOCUMENTS

| GB | 971816 | A  | 10/1964 |
|----|--------|----|---------|
| JP | 4091035 | B2 | 5/2008 |
| WO | 2004104462 | A1 | 12/2004 |
| WO | 2009015528 | A1 | 2/2009 |
| WO | 2012159689 | A1 | 11/2012 |
| WO | 2014135909 | A1 | 9/2014 |
| WO | 2015185132 | A  | 12/2015 |
| WO | 2018005528 | A1 | 1/2018 |
| WO | 2018049526 | A1 | 3/2018 |
| WO | 2018065217 | A1 | 4/2018 |
| WO | 2019124131 | A1 | 6/2019 |
| WO | 2019149498 | A1 | 8/2019 |
| WO | 2019207451 | A2 | 10/2019 |
| WO | 2019218072 | A1 | 11/2019 |

OTHER PUBLICATIONS

International Search Report and Written opinion for Application No. PCT/CA2020/000124 dated Feb. 4, 2021 (8 pages).

European Patent Office Partial Supplementary European Search Report for application 20882512.5, dated Sep. 27, 2023 (15 pages).

International Preliminary Report on Patentability for Application No. PCT/CA2022/050657 dated Oct. 24, 2023 (6 pages).

International Search Report and Written opinion for Application No. PCT/CA2022/050657 dated Jul. 29, 2022 (10 pages).

European Patent Office Action for Application No. 22798449.9 dated Nov. 21, 2024 dated (8 pages).

International Preliminary Report on Patentability for Application No. PCT/CA2020/000124 dated May 12, 2022 (6 pages).

\* cited by examiner

PUMP NOISE ATTENUATOR AND METHOD THEREOF

CROSS-REFERENCE TO RELATED APPLICATIONS

This application is a national phase of International Patent Application No. PCT/CA2020/000124, filed on Oct. 30, 2020, which claims priority to U.S. Provisional Patent Application No. 63/014,808, filed Apr. 24, 2020, and to U.S. Provisional Patent Application No. 62/929,577, filed Nov. 1, 2019, the entire content of each of which is incorporated herein by reference.

BACKGROUND

The present disclosure relates to a pump noise attenuator and method for commercial and residential use, and more specifically for use within vehicular seating systems (aircraft, automobiles, etc.).

SUMMARY

It may be desirable to reduce noise created by a pump during operation. For example, when configuring a pump for a specific application it may be desirable to reduce, change, or remove a frequency of vibration created by a pump, which can manifest as noise heard by a user of an application for the pump. In general, two types of noise may be produced by a pump: motor noise and pumping noise. In some pumps, for example pneumatic pumps that are connected to an air bladder, the air bladder may act as a speaker that amplifies periodic bursts of air produced by the pump when the pump is operating. To reduce such noise, pumps according to the present disclosure may be located in a plastic housing filled with foam, suspended on rubber mounts, and/or include a muffler placed along an output line from the pump.

The present disclosure provides a configuration for a pump and a method of pumping air from a pump and into a pneumatic line that provides for improved reduction and/or optimization of pump noise. As described in greater detail below, an end cap and/or seal and motor mount configuration may reduce noise generated by air flowing through a pump assembly during operation of a pneumatic bladder system. The resulting pump assembly may be advantageously used in applications of the pneumatic bladder system (e.g., in vehicle seats, massage chairs, etc.) where quieter operation is desirable.

For example, the present disclosure provides, in one aspect, a pump assembly including a pneumatic pump with a pump body having a discharge passage, the pneumatic pump operable to discharge compressed air through the discharge passage, a cap adjacent the pump body, the cap at least partially enclosing a first volume in communication with the discharge passage, and a casing at least partially surrounding the pump. The pump assembly further includes a second volume defined between the casing and the cap, the second volume in fluid communication with the first volume via an opening in the cap, and a casing outlet in fluid communication with the second volume. The pump assembly is configured such that the compressed air flows through the first volume and the second volume before being discharged from the casing through the casing outlet.

The present disclosure provides, in another aspect, a pump assembly including a pneumatic pump with a pump body having a discharge passage, the pneumatic pump operable to discharge compressed air through the discharge passage, a casing at least partially surrounding the pump, a volume between the casing and the pump body, the volume in fluid communication with the discharge passage, and a casing outlet in fluid communication with the volume. The pump assembly is configured such that the compressed air changes direction and flows through the volume before being discharged from the casing through the casing outlet.

The present disclosure provides, in another aspect, a pump assembly including a pneumatic pump with a body having a discharge passage. The pneumatic pump is operable to discharge compressed air through the discharge passage. A casing at least partially surrounds the pneumatic pump. The casing includes an outlet passage. The pump assembly also includes a tube fluidly connecting the discharge passage and the casing outlet passage. The pump assembly is configured such that the compressed air flows through the discharge passage and into the tube prior to being discharged from the casing through the outlet passage, and the tube defines a first vibration-isolating connection between the pneumatic pump and the casing.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. In addition, as used herein, the terms "upper", "lower", and other directional terms are not intended to require any particular orientation but are instead used for purposes of description only.

DETAILED DESCRIPTION

Figure 1:
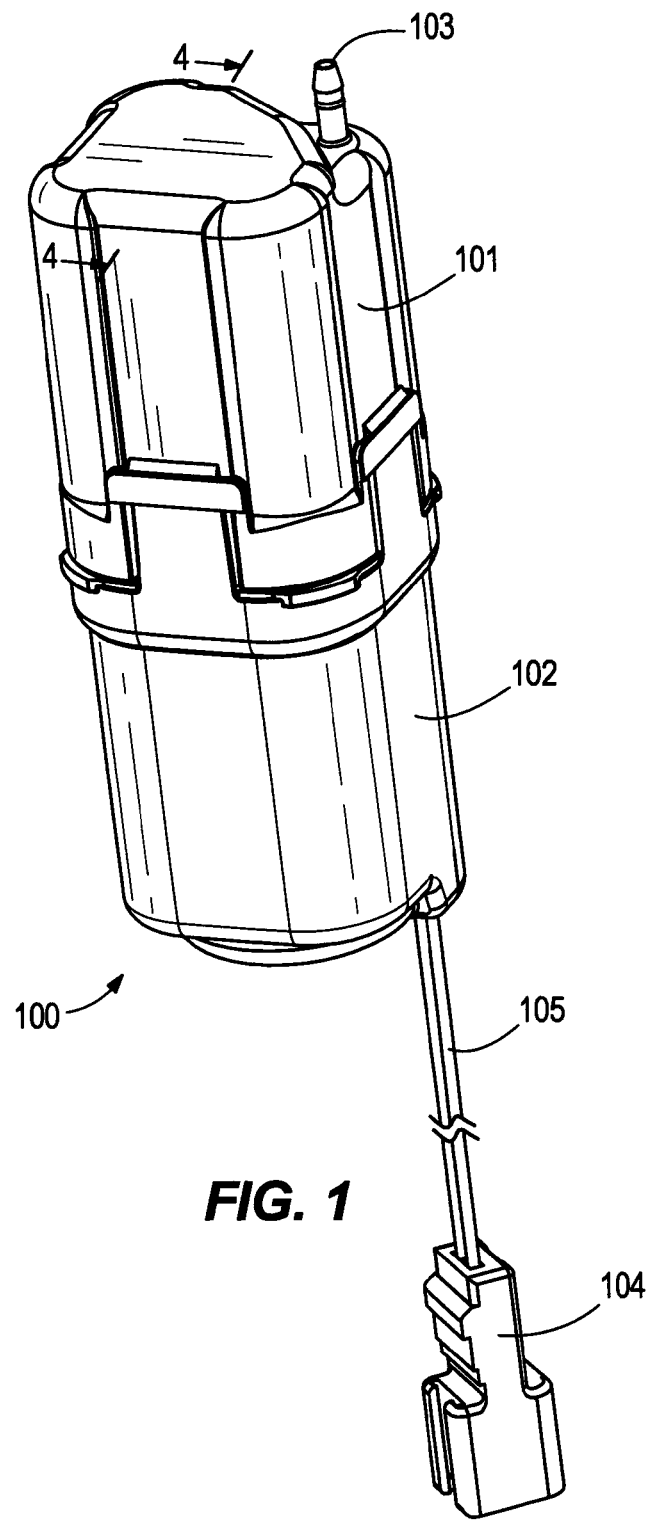
FIG. 1 is a perspective view of an embodiment of a pump assembly according to the present disclosure.

FIG. 1 illustrates a pump assembly 100 including a first or upper casing 101 and a second or lower casing 102. In an embodiment, the pump assembly 100 is configured for providing air for use in an application, for example in an automotive application. Such air may be provided from the pump assembly 100 through an upper casing outlet 103. The pump assembly 100 may include a pump configured to run (i.e., pump air through the upper casing outlet 103) using an electrical connection 105, which may supply electric power to the pump assembly 100. The electrical connection 105 may, through the use of a connector 104, be connected to a power source.

Figure 2:
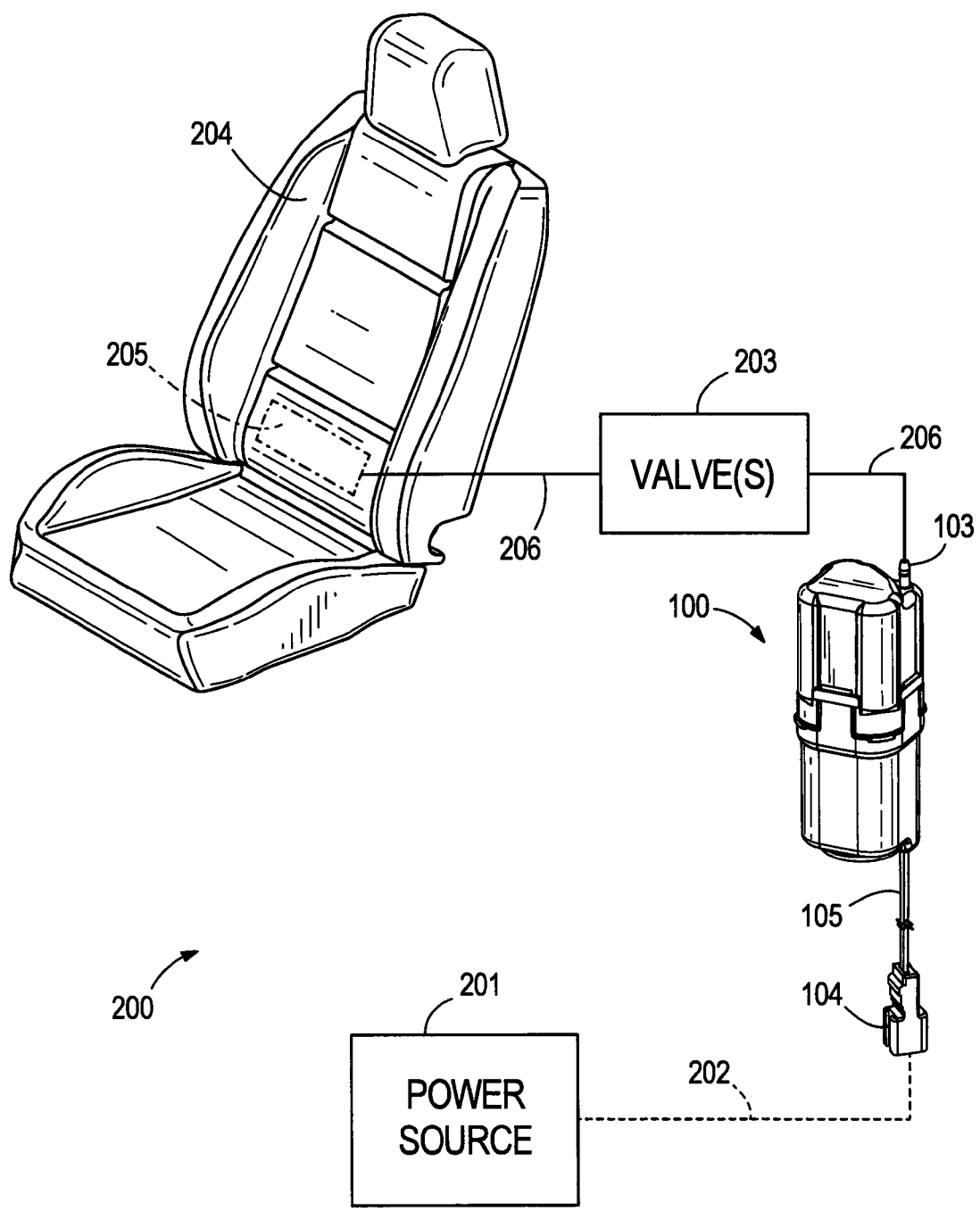
FIG. 2 is a schematic illustration of a pneumatic system according to the present disclosure, including the pump assembly of FIG. 1.

FIG. 2 illustrates an embodiment of a pneumatic system 200 including the pump assembly 100. The pneumatic system 200 may be a portion of an automobile. For example, in the illustrated embodiment, the pneumatic system 200 is part of an automobile seating assembly. Other applications of the pneumatic system 200 are contemplated, however, such as aerospace applications, office/desk chair applications, or the like.

In the illustrated embodiment, the pneumatic system 200 includes a power source 201, which may be part of an electrical power system of an automobile. The connector 104 is configured to connect to the power source 201. As such, the power source 201 may supply power 202 (e.g., at 12 Volts or 24 Volts in some embodiments) through the electrical connection 105 and to the pump assembly 100 via the connector 104.

When the pump assembly 100 is powered, the pump assembly 100 may operate to pump air through the upper casing outlet 103. Air may flow from the upper casing outlet 103 through a pneumatic line 206. The pneumatic line 206 may include valves 203 along or at either end of the pneumatic line 206. The valves 203 may be a single valve and/or may be multiple valves, and in either case may serve to: (i) direct air along the pneumatic line 206 from the pump assembly 100, (ii) stop a flow of air along the pneumatic line 206 directed from the pump assembly 100, (iii) regulate pressure of a flow of air through the pneumatic line 206, and/or (iv) regulate flow rate of a flow of air through the pneumatic line 206. Additionally or alternatively, the valves 203 may include a release valve, which may allow air to vent from the pneumatic line 206 to the atmosphere or into another, connected pneumatic line.

The pneumatic line 206 may be connected to one or more bladders 205. The bladder 205 may be configured to expand or contract as air from the pneumatic line 206 flows into or is removed from the bladder 205. In an embodiment, the bladder 205 may be supported in a bladder supporting device 204. In some embodiments, the bladder supporting device 204 is a seat configured to be positioned within an automobile. In an embodiment, the bladder 205 may be positioned within the bladder supporting device 204 to provide lumbar support when a user sits against the bladder supporting device 204. In such an embodiment, the user may provide a request for increasing or decreasing lumbar support (e.g., the user may press a button) which may activate the pump assembly 100 to provide air from the pump assembly 100, through the pneumatic line 206, and into the bladder 205 positioned within the bladder supporting device 204, thereby inflating the bladder 205 and providing the requested lumber support.

Figure 3:
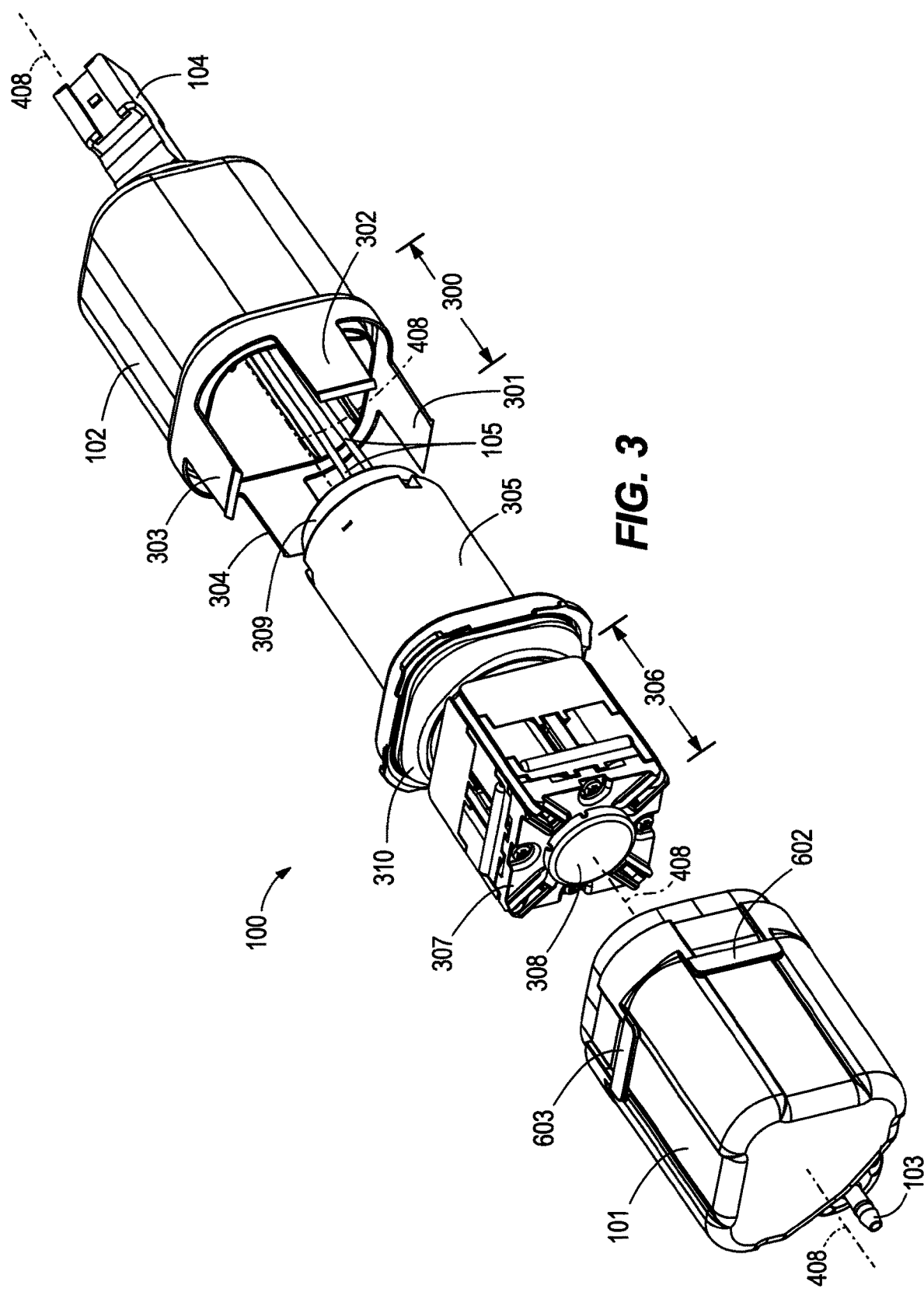
FIG. 3 is an exploded view of the pump assembly of FIG. 1.

FIG. 3 illustrates an assembly view of an embodiment of the pump assembly 100 along a longitudinal axis or centerline 408. The pump assembly 100 may include the upper casing 101 and a lower casing 102. The upper casing may include the upper casing outlet 103. The lower casing 102 may be configured to engage the upper casing 101. For example, the lower casing may include a locking device 300 configured to engage the upper casing 101. In an embodiment, the locking device 300 includes four lock members 301, 302, 303, and 304 positioned equidistantly around a circumference of the upper casing 101. Each of the lock members 301, 302, 303, and 304 may be configured to engage a corresponding receiving portion, for example receiving portions 602 and 603 shown in FIG. 3. As such, to connect the upper casing 101 with the lower casing 102, the lock members 302 and 303 may engage (e.g., by clipping into) the receiving portions 602 and 603.

In an embodiment, a seal 310 may be positioned between the upper casing 101 and the lower casing 102 to provide a substantially air-tight seal between the upper casing 101 and the lower casing 102. In an embodiment, the seal 310 comprises rubber or another suitable resilient elastomeric material. Greater detail regarding the seal 310 is provided in reference to FIG. 4.

With continued reference to FIG. 3, the connector 104 and the electrical connection 105 may pass through a motor mount 309 and into a lower pump assembly 305. The lower pump assembly 305 may be connected to an upper pump assembly 306. The seal 310 may be located at the connection between the lower pump assembly 305 and the upper pump assembly 306, and may engage both the lower pump assembly 305 and the upper pump assembly 306. Accordingly, when the upper casing 101 is connected to the lower casing 102, the seal 310 may retain the lower pump assembly 305 and the upper pump assembly 306 because the seal 310 at the same time may also engage the upper casing 101 and the lower casing 102. The motor mount 309 may be configured to engage the lower pump assembly 305 and the lower casing 102 when the lower casing 102 is locked to the upper casing 101.

The upper pump assembly 306 may be connected to an outlet plate 307, which may be positioned on an opposite side of the upper pump assembly 306 from the seal 310. An end cap 308 may be positioned on/adjacent the outlet plate 307 and positioned on the opposite side of the outlet plate 307 from the upper pump assembly 306. In some embodiments, the cap 308 may be integrally formed with the outlet plate 307 and/or other portions of the upper pump assembly 306. In other embodiments, the cap 308 may be formed separately and coupled to the outlet plate 307 by a snap-fit, one or more fasteners, adhesive(s), or any other suitable means.

Figure 4:
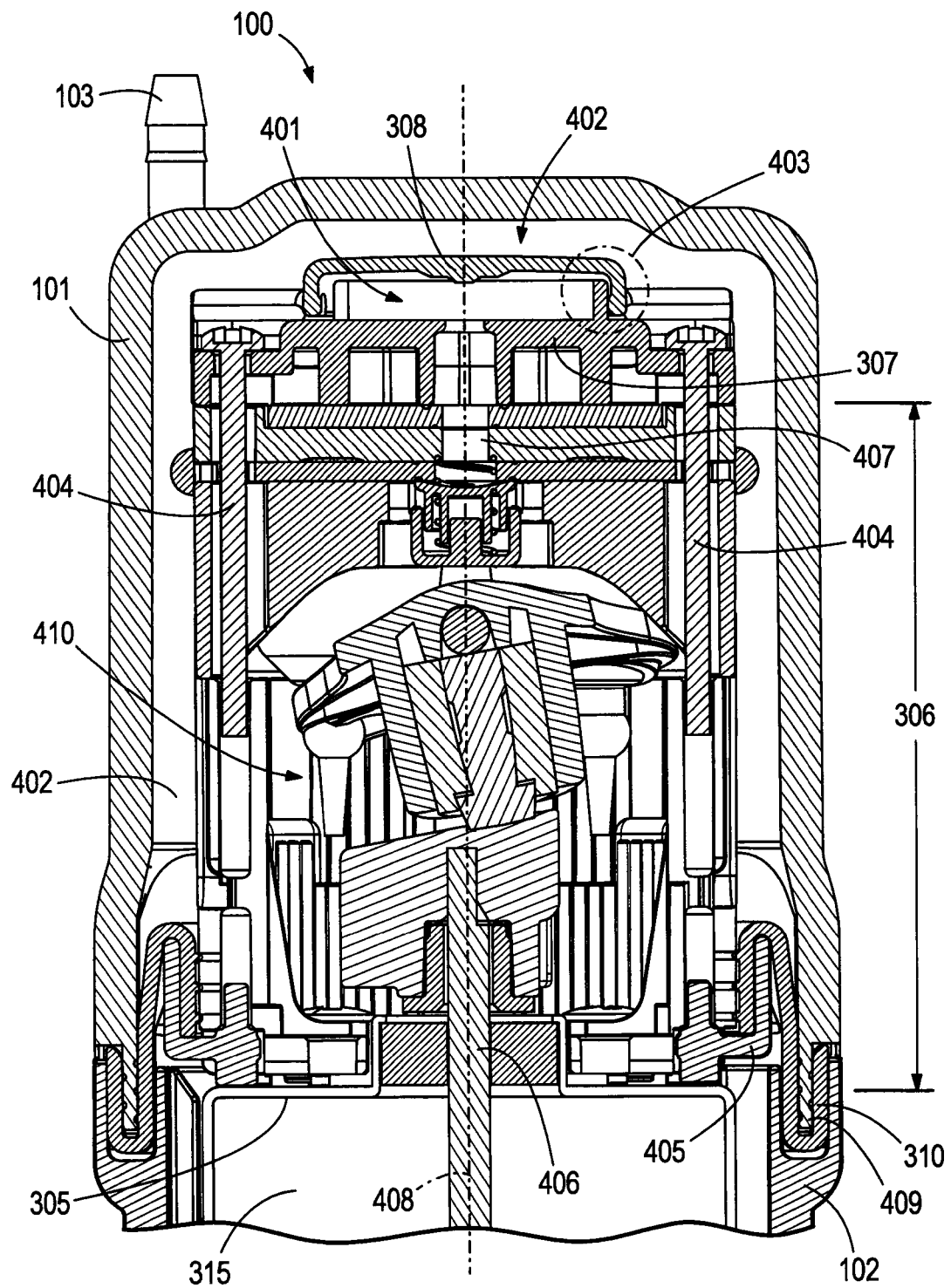
FIG. 4 is a cross-sectional view along a centerline of the pump assembly of FIG. 1.

FIG. 4 illustrates a cross-section view along the centerline 408 of a portion of the pump assembly 100. In FIG. 4, the lower pump assembly 305 is shown connected to the upper pump assembly 306. A drive interface 406 may extend between the lower pump assembly 305 and the upper pump assembly 306 and may provide electrical and/or mechanical communication between the lower pump assembly 305 and the upper pump assembly 306. For example, the lower pump assembly 305 may include an electrical motor 315, and the upper pump assembly 306 may include a pneumatic pump 410. In such an embodiment, the drive interface 406 may communicate rotational energy (for example, via a driveshaft) to the upper pump assembly 306 to drive the pneumatic pump 410 contained therein.

The pneumatic pump 410 may pump air through an upper assembly outlet 407 in the outlet plate 307 and into a first volume (i.e., a first chamber) 401. The upper assembly outlet 407 may be positioned along and parallel to the centerline 408. The outlet plate 307 may be secured to the upper pump assembly 306 via a plurality of pins 404 or in any other suitable manner. In other embodiments, the outlet plate 307 may be integrally formed with one or more portions of the upper pump assembly 306. The first volume 401 in the illustrated embodiment is defined by the outlet plate 307 and the end cap 308. The first volume 401 is in communication with the upper assembly outlet 407 such that air discharged by the pneumatic pump 410 enters the first volume 401.

Figure 5:
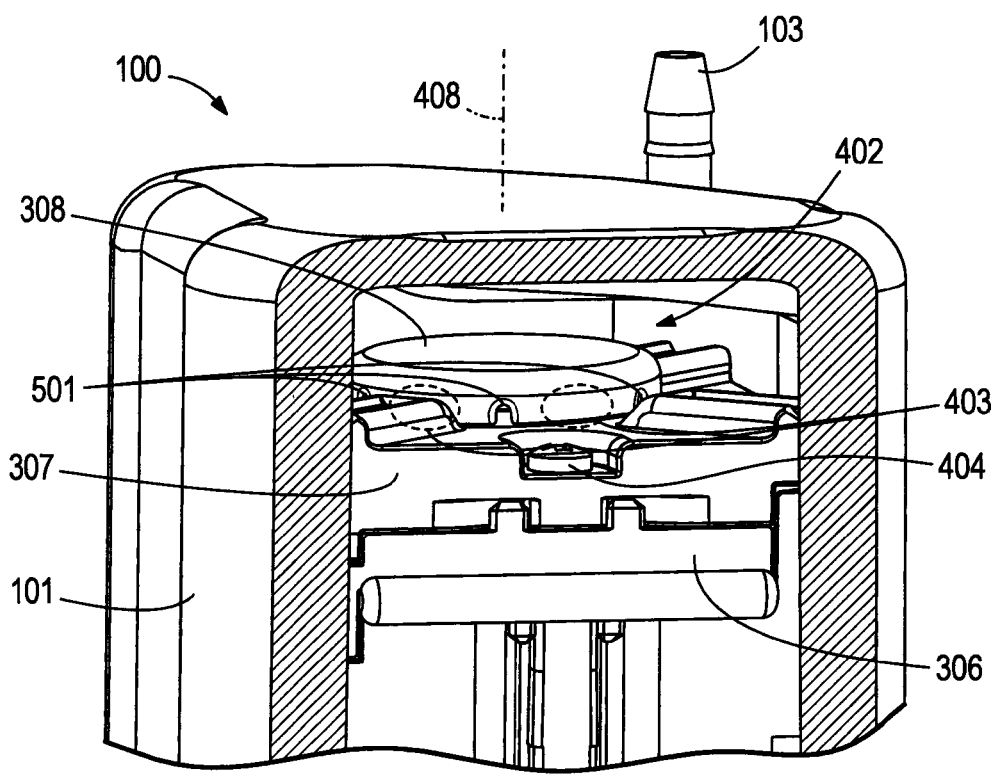
FIG. 5 is a cross-sectional view offset from a centerline of the pump assembly of FIG. 1, illustrating a cap of the pump assembly.

With reference to FIG. 5, the end cap 308 may be substantially sealed to the outlet plate 307 via a plurality of inter-engaging features or snaps 403. Air that is pumped into the first volume 401 may be forced out and into a second volume (i.e., a second chamber) 402 by the pneumatic pump 410 via a plurality of outlets 501 arranged about the periphery of the end cap 308. While the end cap 308 is shown with the plurality of spaced outlets 501 spaced by the equidistantly spaced snaps 403, either and/or both of the outlets 501 and the snaps 403 may be provided singularly or non-uniformly about the end cap 308. The plurality of outlets 501 from the end cap 308 may be positioned offset and equidistant from the centerline 408 and may additionally or alternatively be positioned perpendicular to the centerline 408.

Referring again to FIG. 4, the second volume 402 may be defined by the end cap 308, the outlet plate 307, the upper pump assembly 306, the seal 310 and the upper casing 101. In the illustrated embodiment, the second volume 402 surrounds the first volume 401, and the second volume 402 may extend cylindrically along the centerline 408 to the seal 310, which serves to terminate the second volume 402 (i.e., the second volume 402 extends around the entire head of the pump 410). Air may then be forced from the second volume 402 and out of the upper casing outlet 103 to be used in a downstream application. In an embodiment, the upper casing outlet 103 may be positioned parallel to the centerline 408.

In the illustrated embodiment, the first volume 401 is smaller than the second volume 402. As such, the first volume 401 may act as a first resonant cavity for higher frequency vibrations (e.g., greater than 500 Hz) emitted from the pneumatic pump 410. The second volume 402 may act as a resonant chamber for lower frequency vibrations (e.g., 500 Hz or less) emitted by the pneumatic pump 410. The relative volumes of the first volume 401 and the second volume 402 may be tuned to remove specific frequency vibrations emitted from the pneumatic pump 410. In such an embodiment, the combination of the end cap 308, the first volume 401 and the second volume 402 may serve to muffle or diminish sound created by the operation of the pneumatic pump 410.

For example, the first volume 401 may be configured to resonate at a relatively high, first resonant frequency (e.g., above 500 Hertz (Hz) in some embodiments) and the second volume 402 may be configured to resonate at a lower, second resonant frequency (e.g., below 500 Hz). In some embodiments, the first resonant frequency is at least 10% higher than the second resonant frequency. In some embodiments, the first resonant frequency is at least 25% higher than the second resonant frequency. As airflow passes through the volumes 401, 402 during operation, the differing resonances of the volumes 401, 402 may produce destructive interference that attenuates the sound produced by air flowing through the pump assembly 100. This is accomplished without any active noise cancelling or absorbent materials (e.g., foam, baffles, etc.) lining the airflow path, which would tend to increase flow resistance and decrease flow rate.

Furthermore, the configurations described and illustrated herein may be desirable to limit sound from vibrations and air pulses created by the pneumatic pump 410. The upper casing outlet 103 is not in direct communication with the upper assembly outlet 407 in the illustrated embodiment, because the first volume 401 and the second volume 402 are disposed fluidly between the upper assembly outlet 407 and the upper casing outlet 103. That is, air discharged from the pneumatic pump 410 through the upper assembly outlet 407 must pass through both the first volume 401 and the second volume 402 before being discharged from the pump assembly 100 through the upper casing outlet 103. In addition, the orientations of the outlets 501 in the end cap 308 (e.g., perpendicular to the centerline 408) and the orientation of the upper casing outlet 103 (e.g., parallel to the centerline 408) may also force the pumped air to change directions and thereby form a tortuous pathway for the pumped air. These features may advantageously reduce downstream noise amplification effects that may be produced by the bladder(s) 205 or other components of the pneumatic system 200.

Referring to FIG. 4, the seal 310 may be configured to reduce vibration of the pneumatic pump 410 and/or motor 315 and thereby further reduce noise generated by the pump assembly 100. For example, the seal 310 may extend along the centerline 408 and toward the end cap 308, between the upper pump assembly 306 and a support flange 405 fixed to a lower end of the upper pump assembly 306. Then, the seal 310 may wrap around the support flange 405 and extend away from the end cap 308 and along the centerline 408 to an upper casing extension 409 while positioned between the support flange 405 and the upper casing 101. Then, the seal 310 may wrap around the upper casing extension 409 and extend back toward the end cap 308 along the centerline 408 while positioned between the upper casing 101 and the lower casing 102. Finally, the seal 310 may extend radially away from the centerline 408 and between the upper casing 101 and the lower casing 102. In such an embodiment, the upper casing 101 may be held tightly against the lower casing 102 via the locking device 300, thereby compressing the seal 310 and forming an air-tight seal to enclose the second volume 402 everywhere except at the upper casing outlet 103. In such an embodiment, the seal 310 may serve as a vibration damper to dampen vibration created by the pneumatic pump 410 and/or motor 315.

Figure 6:
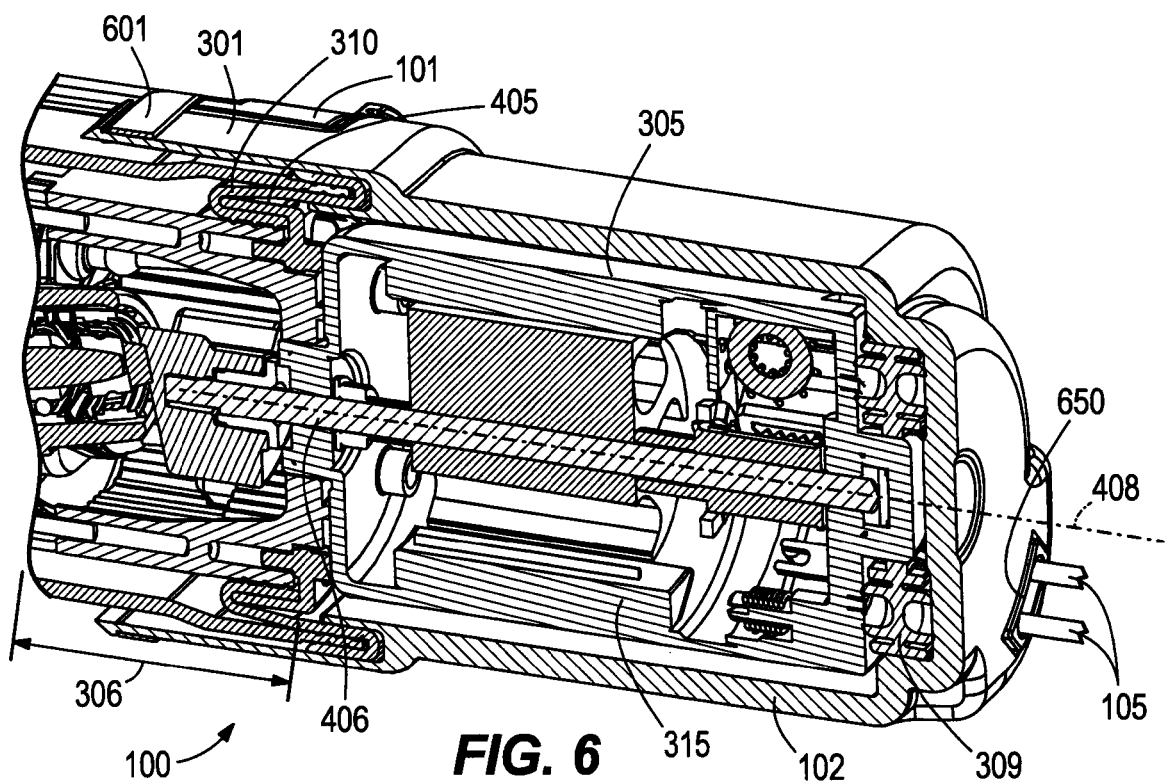
FIG. 6 is another cross-sectional view along a centerline of the pump assembly of FIG. 1.

FIG. 6 illustrates a cross-section view along the centerline 408 of an embodiment of the pump assembly 100. In FIG. 6, the upper casing 101 and the lower casing 102 are locked via the locking device 300, specifically the lock member 301 and upper assembly receiving portion 601 are shown engaged in FIG. 6. Accordingly, the seal 310 is compressed between the upper casing 101, the lower casing 102, and the support flange 405. In such a configuration, the upper pump assembly 306 is likewise held in place axially in the direction away from the lower pump assembly 305 and along the centerline 408 by the engagement of the support flange 405 and the seal 310.

The lower pump assembly 305 is supported at its end opposite the upper pump assembly 306 by the motor mount 309, which may be compressible. In some embodiments, the motor mount 309 may be retained in a compressed position by the support flange 405 engaging the seal 310. Such a configuration may retain the upper pump assembly 306, which may contact the lower pump assembly 305 and may compress the motor mount 309 between the lower pump assembly 305 and the lower casing 102. In an embodiment, the motor mount 309 may include rubber or another suitable resilient elastomeric material. In such a configuration, the motor mount 309 may further act to dampen vibrations created by the pneumatic pump 410 and/or the motor 315. Further, in such a configuration, the only contact points between the pneumatic pump 410 and the upper casing 101, and between the motor 315 and the lower casing 102 are resilient contact points (via the seal 310 and the motor mount 309), thereby further damping the vibration. Stated otherwise, the pneumatic pump 410 and the motor 315 may be fully supported on resilient rubber/elastomeric mounts.

As shown in FIG. 6, the motor mount 309 still allows for access for the electrical connection 105 to connect to the lower pump assembly 305 to power the pneumatic pump. For example, the motor mount 309 includes an inlet opening 650 that provides a passage for the electrical connection 105. In some embodiments, the inlet opening 650 also serves as an air inlet to the pump assembly 100 to provide an air supply for the pneumatic pump 410.

Figure 7:
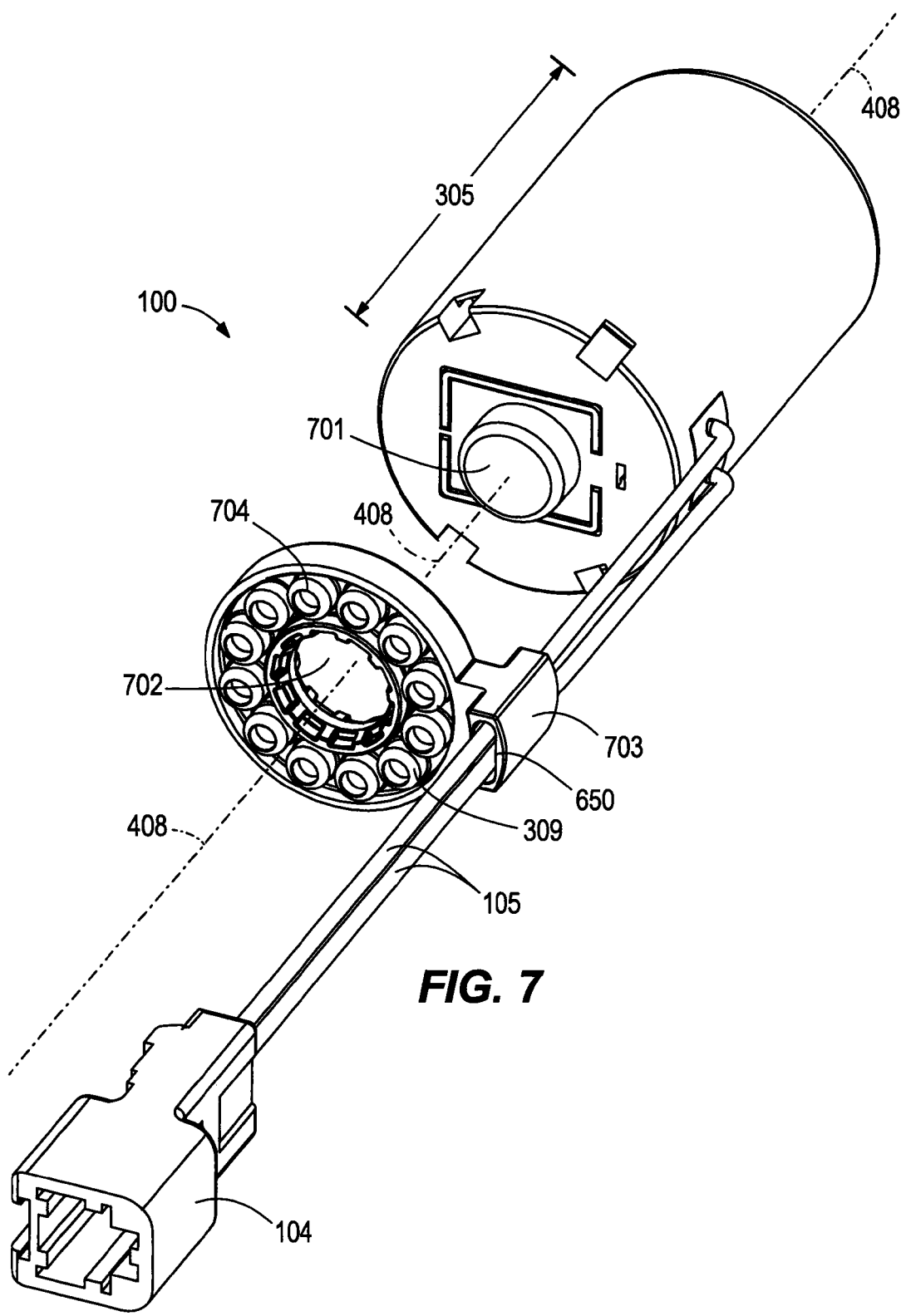
FIG. 7 illustrates a partially assembled view of an embodiment of the pump assembly of FIG. 1 with a lower casing removed.

FIG. 7 illustrates an assembly view of an embodiment of the pump assembly 100. FIG. 7 is provided without the lower casing 102 for illustration purposes. As shown, the motor mount 309 may be configured with a motor mount recess 702. As such, the illustrated motor mount 309 has an annular shape. The motor mount recess 702 may be configured to engage a lower pump assembly engagement portion 701 positioned on the lower pump assembly 305. As shown, the lower pump assembly engagement portion 701 may be generally cylindrical and configured to engage the correspondingly cylindrical motor mount recess 702. While not required to be cylindrical, providing both the lower pump assembly engagement portion 701 and the motor mount recess 702 in a cylindrical configuration may provide the additional advantage of damping in a radial direction perpendicular to the centerline 408. In such an embodiment damping of the pneumatic pump 410 and motor 315 is improved because the seal 310 (not shown in FIG. 7) and the motor mount 309 together provide for radial damping along the centerline 408 at two different locations along the centerline 408, which removes or limits another degree of freedom of vibration, namely, vibration rotationally along the centerline 408.

With continued reference to FIG. 7, the illustrated motor mount 309 further includes a plurality of compressible tubular elements 704 arranged about the periphery of the motor mount recess 702. The tubular elements 704 may reduce the weight and amount of material required to form the motor mount 309 while providing a desired amount of compressibility. In other embodiments, the motor mount 309 may include other configurations, such as a honeycomb pattern. In the illustrated embodiment, the motor mount 309 also includes a radial projection 703. The inlet opening 650 extends through the radial projection 703 to allow the electrical connection 105 to pass from the connector 104, through the motor mount 309, and into the lower pump assembly 305 such the electricity may be supplied to the pneumatic pump 410.

In the illustrated embodiment, the entire motor mount 309, including the radial projection 703 and the tubular elements 704, is integrally formed as a single piece of resilient material via a suitable molding process. In other embodiments, however, the motor mount 309 may be formed in other ways.

The embodiments described and illustrated herein thus provide a method of reducing vibration of the pump assembly 100 that may include supporting the lower pump assembly 305 and/or the upper pump assembly 306 within the upper casing 101 and the lower casing 102 with the seal 310 and/or the motor mount 309. The seal 310 and/or the motor mount 309 may be configured to dampen vibration in the axial direction (i.e., along the centerline 408) and/or the radial direction (i.e., radially in a plane perpendicular to the centerline 408).

The embodiments described and illustrated herein further provide a method of directing air from a pump to an application that may include providing compressed air from the pneumatic pump, directing the air through the upper assembly outlet 407 positioned on the outlet plate 307 and into the first volume 401, with the first volume 401 defined at least by the outlet plate 307 and the end cap 308. The method may additionally or alternatively include directing the air from the first volume 401, through the outlets 501 positioned on the end cap 308 and into the second volume 402, the second volume 402 defined by at least the end cap 308 and the upper casing 101. The method may additionally or alternatively include directing the air from the second volume 402 and through the upper casing outlet 103. In an embodiment, the upper casing outlet 103 is connected to a pneumatic line or other structure where compressed air may be desired.

Figure 8:
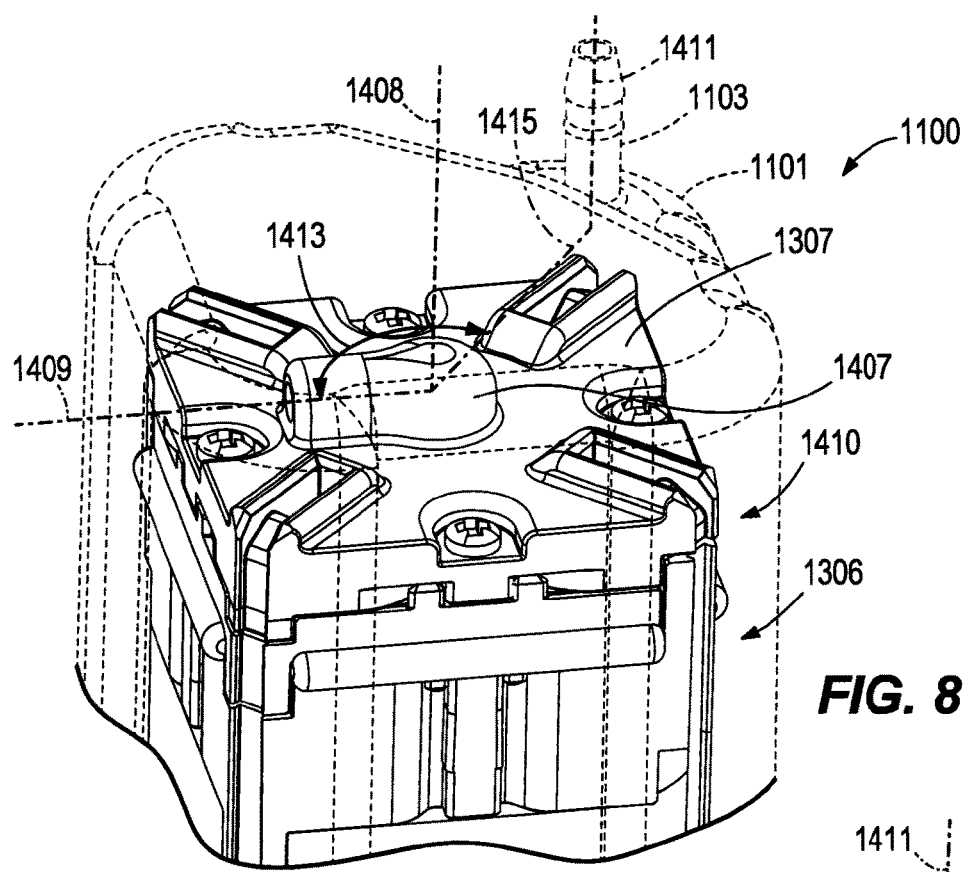
FIG. 8 is a perspective view illustrating a portion of a pump assembly according to another embodiment, with an upper casing of the pump assembly shown partially transparent.
Figure 9:
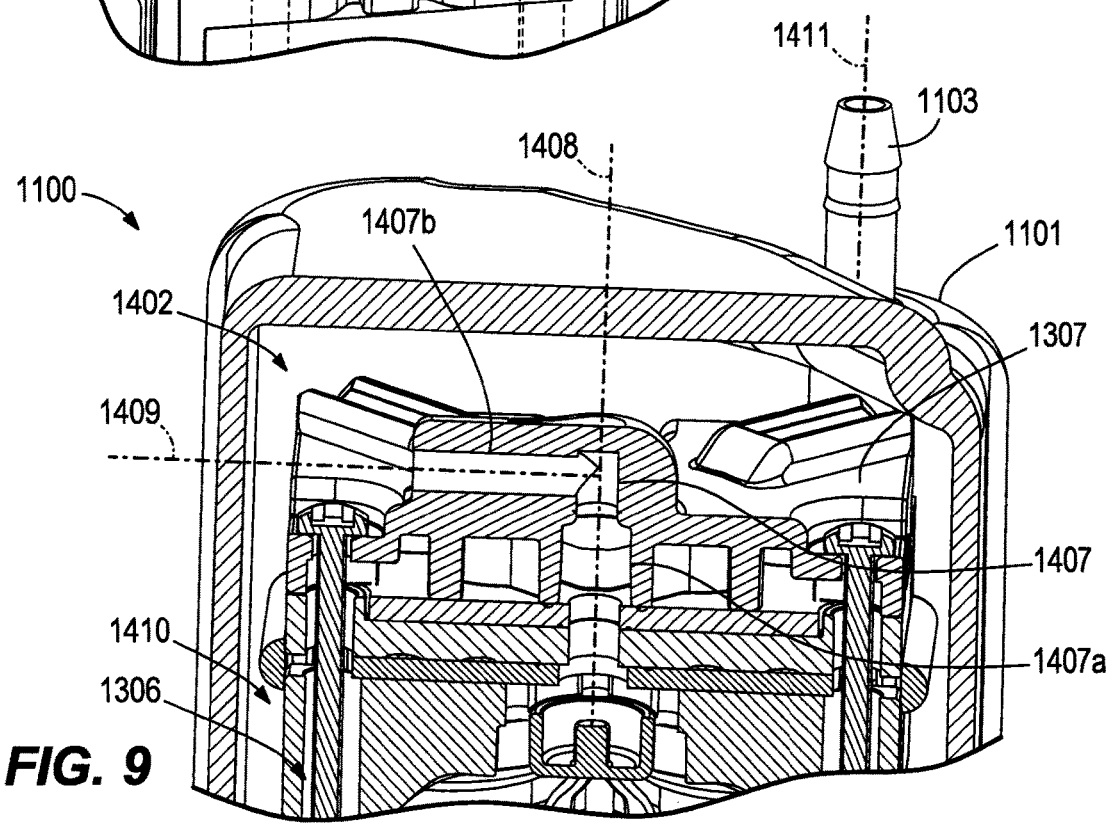
FIG. 9 is a cross-sectional view of the portion of the pump assembly of FIG. 8, taken along a centerline of the pump assembly.

FIGS. 8 and 9 illustrate a portion of a pump assembly 1100 according to another embodiment. The pump assembly 1100 is similar to the pump assembly 100 described above with reference to FIGS. 1-7, and features and elements of the pump assembly 1100 corresponding with features and elements of the pump assembly 100 are given identical reference numbers plus 1000. In addition, the following description focuses primarily on differences between the pump assembly 1100 and the pump assembly 100.

With reference to FIGS. 8-9, the illustrated pump assembly 1100 includes a pneumatic pump 1410 having an outlet plate 1307. The pneumatic pump 1410 may pump air through an upper assembly outlet 1407 in the outlet plate 1307. In the illustrated embodiment, the upper assembly outlet 1407 includes a first portion 1407a, which may extend along or parallel to a longitudinal axis or centerline 1408 of the pump assembly 1100, and a second portion 1407b downstream of the first portion 1407a (FIG. 9). The second portion 1407b may extend radially outward from the centerline 1408 and along a second axis 1409 oriented at an angle with respect to the centerline 1408. In the illustrated embodiment, the second axis 1409 is oriented perpendicular to the centerline 1408; however, the second axis 1409 may be oriented at other angles relative to the centerline 1408. As such, air that is pumped by the pneumatic pump 1410 may change direction at the transition between the first portion 1407a and the second portion 1407b, and may then be discharged from the second portion 1407b (e.g., in a direction generally perpendicular to the centerline 1408).

The second portion 1407b of the upper assembly outlet 1407 may be in fluid communication with a volume or chamber 1402 surrounding the upper pump assembly 1306 (FIG. 9). The volume 1402 may be defined, for example, between the upper pump assembly 1306 and the upper casing 1101. In other words, the upper casing 1101 may be spaced from the outside of the upper pump assembly 1306 to define the volume 1402 therebetween. The air that is discharged from the second portion 1407b of the upper assembly outlet 1407 may enter the volume 1402 before being discharged from the upper casing 1101 via the upper casing outlet 1103.

The upper casing outlet 1103 may extend along a third axis 1411 that is parallel to the centerline 1408. The second portion 1407*b* of the upper assembly outlet 1407 may extend generally away from the upper casing outlet 1103. For example, referring to FIG. 8, the second axis 1409 may be oriented at an angle 1413 relative to a line 1415 extending between the centerline 1408 and the third axis 1411. The angle 1413 may be between about 45 degrees and about 180 degrees in some embodiments, between about 90 degrees and about 180 degrees in some embodiments, or between about 120 degrees and about 180 degrees in some embodiments.

Because the volume 1402 is disposed fluidly between the upper assembly outlet 1407 and the upper casing outlet 1103, air discharged from the pneumatic pump 1410 through the upper assembly outlet 1407 must pass through the volume 1402 before being discharged from the pump assembly 1100 through the upper casing outlet 1103. In addition, the orientation of the second portion 1407*b* of the upper assembly outlet 1407 (e.g., perpendicular to the centerline 1408 and oriented generally away from the upper casing outlet 1103) and the orientation of the upper casing outlet 1103 (e.g., parallel to the centerline 1408) may also force the pumped air to change directions and thereby form a tortuous pathway for the pumped air. These features may advantageously reduce downstream noise amplification effects and provide for quieter operation of the pump assembly 1100 (e.g., in a pneumatic system such as the pneumatic system 200).

Figure 10:
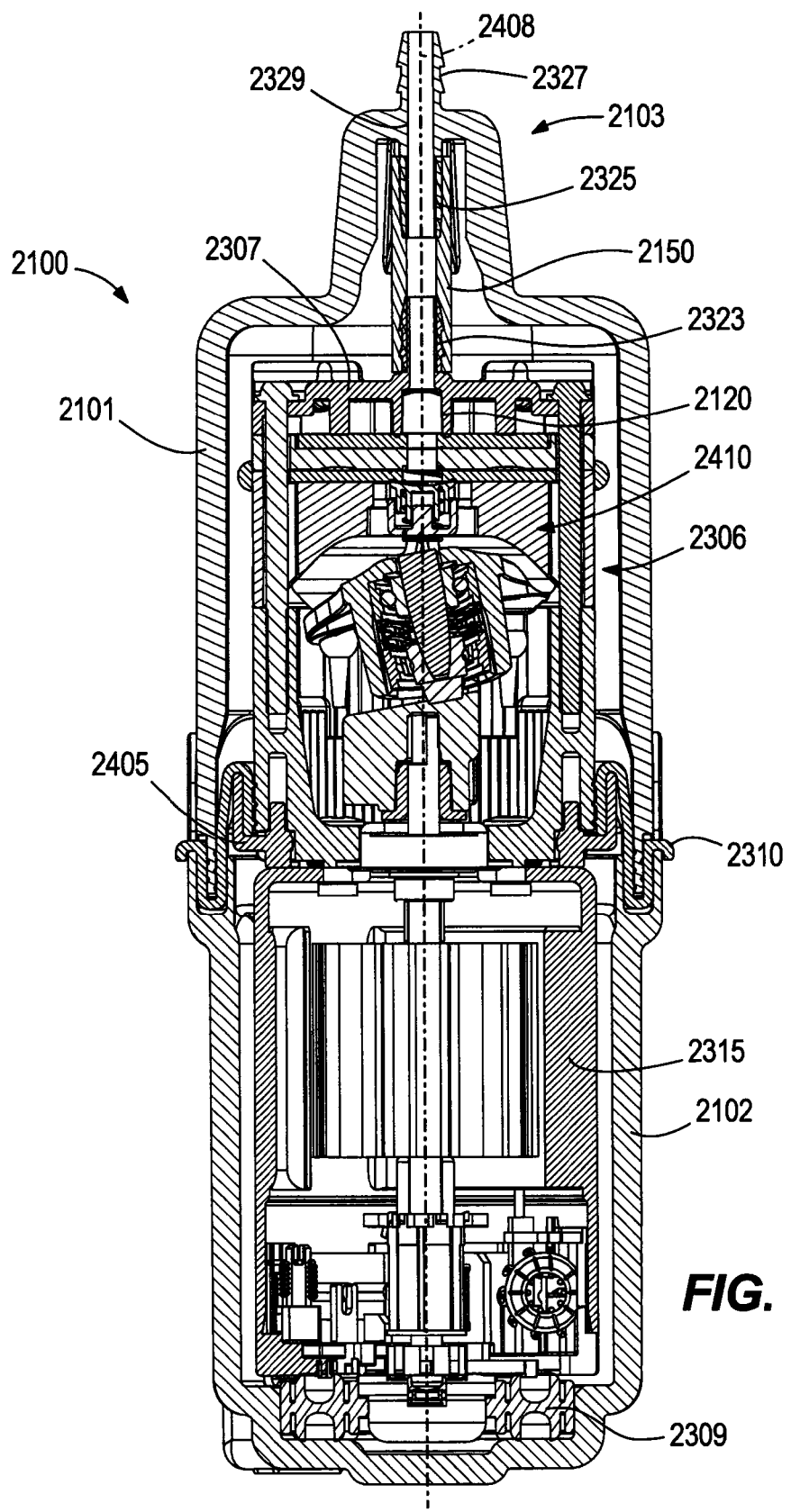
FIG. 10 is a cross-sectional view illustrating a pump assembly according to another embodiment.

FIG. 10 illustrates a pump assembly 2100 according to another embodiment. The pump assembly 2100 is similar to the pump assembly 100 described above with reference to FIGS. 1-7, and features and elements of the pump assembly 2100 corresponding with features and elements of the pump assembly 100 are given identical reference numbers plus 2000. In addition, the following description focuses primarily on differences between the pump assembly 2100 and the pump assembly 100.

With reference to FIG. 10, the illustrated pump assembly 2100 includes a first or upper casing 2101 connected to a second or lower casing 2102. An electric motor 2315 is disposed at least partially within the lower casing 2102. An upper pump assembly 2306, which includes a pneumatic pump 2410 (e.g., a diaphragm pump) in the illustrated embodiment, is disposed at least partially within the upper casing 2101. As such, the upper casing 2101 and lower casing 2102 cooperate to enclose the motor 2315 and the upper pump assembly 2306.

A seal 2310, which may be similar to the seal 310 described above with reference to FIG. 4, is positioned between the upper casing 2101 and the lower casing 2102. The seal 2310 extends between a support flange 2405 fixed to a lower end of the upper pump assembly 2306 and an inner wall of the upper casing 2101. The seal 2310 is made of a flexible material, such as rubber, silicone, other resilient elastomeric materials, or the like. As such, the seal 2310 provides a vibration-isolating or dampening connection between upper pump assembly 2306 and the upper casing 2101.

With continued reference to FIG. 10, in the illustrated embodiment, the lower end of the motor 2315 is supported by a motor mount 2309, which may be similar to the motor mount 309 described above with reference to FIGS. 6-8. The motor mount 2309 is made of a flexible material, such as rubber, silicone, other resilient elastomeric materials, or the like. As such, the motor mount 2309 provides a vibration-isolating or dampening connection between the motor 2315 and the lower casing 2102.

The upper pump assembly 2306 includes an outlet plate 2307 and an outlet plate fitting 2323 that extends from the outlet plate 2307 along a centerline 2408 of the pump assembly 2100. In the illustrated embodiment, the outlet plate fitting 2323 is configured as a barb fitting; however, the outlet plate fitting 2323 may be configured differently in other embodiments. The outlet plate fitting 2323 is integrally formed with the outlet plate 2307 in the illustrated embodiment (e.g., as a molded part). Alternatively, the outlet plate fitting 2323 may be formed separately and coupled to the outlet plate 2307 via any suitable connection (and preferably an air-tight connection, such as a threaded connection). An outlet plate exhaust passage 2120 extends through the outlet plate 2307 and the outlet plate fitting 2323 and provides an outlet for air to exit the upper pump assembly 2306.

The upper casing 2101 includes an upper casing outlet 2103 positioned at an end of the upper casing 2101. The illustrated upper casing outlet 2103 includes an inner fitting 2325 extending from an interior side of the upper casing 2101 and an outer fitting 2327 extending from an exterior side of the upper casing 2101. The inner fitting 2325 and the outer fitting 2327 are each configured as barb fittings integrally formed with the upper casing 2101 (e.g., as a molded part) in the illustrated embodiment. In other embodiments, the inner fitting 2325 and/or the outer fitting 2327 may have other configurations and may be formed separately and coupled to the upper casing 2101 via any suitable connection (and preferably an air-tight connection, such as a threaded connection). An upper casing outlet passage 2329 extends through the fittings 2325, 2327 and provides an outlet for air to exit the upper casing 2101.

In the illustrated embodiment, the outlet plate discharge passage 2120 and the upper casing outlet passage 2329 are each coaxially aligned with the centerline 2408 of the pump assembly 2100. In other embodiments, the upper casing outlet passage 2329 or a portion thereof may be parallel to the centerline 2408 or oriented at an angle (e.g., a 90-degree angle) relative to the centerline 2408. In yet other embodiments, the outlet plate discharge passage 2120 or a portion thereof may be parallel to the centerline 2408 or oriented at an angle (e.g., a 90-degree angle) relative to the centerline 2408.

With continued reference to FIG. 10, a tube 2150 fluidly connects the outlet plate discharge passage 2120 and the upper casing outlet passage 2329 such that air pumped by the pneumatic pump 2410 may flow from the outlet plate discharge passage 2120 to the upper casing outlet passage 2329 via the tube 2150. The tube 2150 extends linearly along the centerline 2408 in the illustrated embodiment, from the outlet plate fitting 2323 to the inner fitting 2325. In other embodiments, the tube 2150 may be curved.

The tube 2150 couples the upper pump assembly 2306 to the upper casing 2101 to partially support the upper pump assembly 2306 within the upper casing 2101. In the illustrated embodiment, the tube 2150 is made of a flexible material, such as rubber, silicone, other resilient elastomeric materials, or the like. As such, the tube 2150 provides a vibration-isolating or dampening connection between the outlet plate 2307 and the upper casing 2101. In other embodiments, the tube 2150 may be made of a more rigid material, and an elastomeric member (e.g., an o-ring; not shown) may be positioned between the tube 2150 and one of the outlet plate fitting 2323 or the inner fitting 2325. In such embodiments, the tube 2150 and the elastomeric member define the vibration-isolating or dampening connection between the outlet plate 2307 and the upper casing 2101, and the tube 2150 may optionally be integral with the outlet plate fitting 2323 or the inner fitting 2325.

Thus, the tube 2150, seal 2310, and motor mount 2309 collectively support the upper pump assembly 2306 and the motor 2315 within the upper casing 2101 and the lower casing 2102. In the illustrated embodiment, the tube 2150, seal 2310, and motor mount 2309 are the only contact points between the upper pump assembly 2306, the motor 2315, and the casings 2101, 2102. That is, the upper pump assembly 2306 and the motor 2315 are fully supported by the vibration-dampening/isolating mounts of the tube 2550, the seal 2310, and motor mount 2309, which are spaced apart from one another along the centerline 2408. The resilient characteristics of the tube 2550, seal 2310, and motor mount 2309 permit limited relative movement of the motor 2315 and the pneumatic pump 2410 relative to the upper and lower casings 2101, 2102 and therefore isolate the upper casing 2101 and the lower casing 2102 from vibration produced by the motor 2315 and the pneumatic pump 2410 during operation. As such, the noise generated by the pump assembly 2100 during operation is advantageously reduced.

Figure 11:
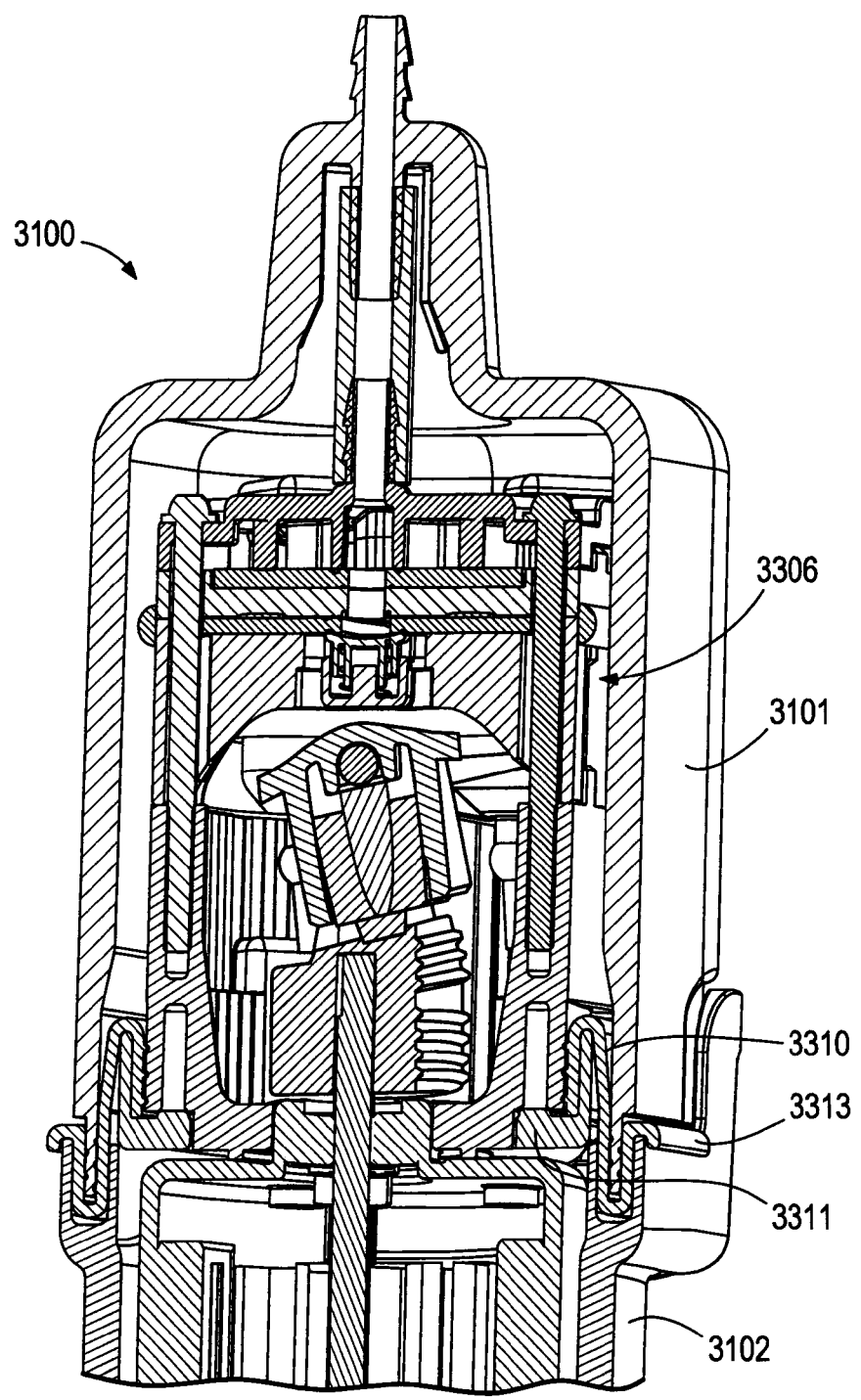
FIG. 11 is a cross-sectional view illustrating a portion of a pump assembly according to another embodiment.
Figure 12:
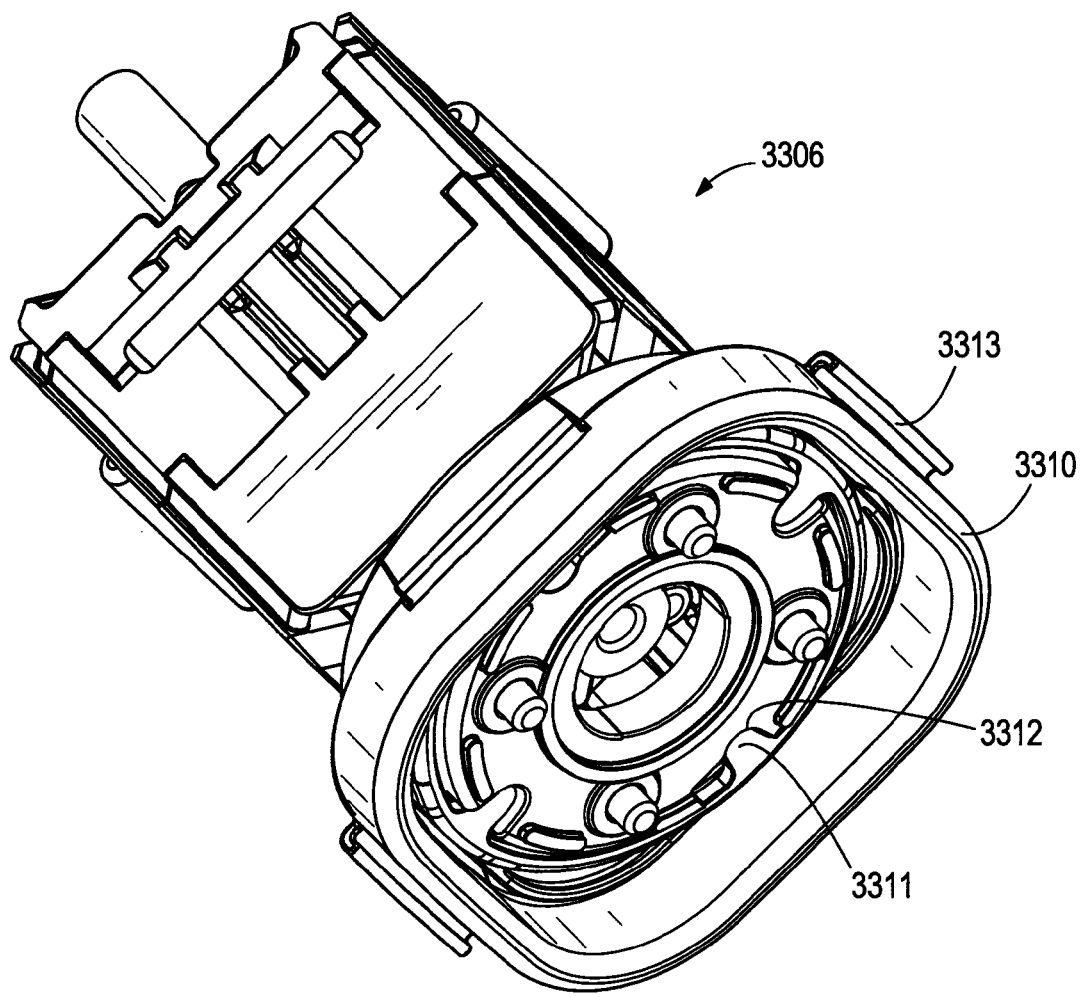
FIG. 12 is a perspective view illustrating a seal of the pump assembly of FIG. 11.

FIGS. 11-12 illustrate portions of a pump assembly 3100 according to another embodiment. The pump assembly 3100 is similar to the pump assembly 2100 described above with reference to FIG. 10, and features and elements of the pump assembly 3100 corresponding with features and elements of the pump assembly 2100 are given identical reference numbers plus 1000. In addition, the following description focuses primarily on differences between the pump assembly 3100 and the pump assembly 2100.

The pump assembly 3100 includes a seal 3310 positioned between the upper casing 3101 and the lower casing 3102 (FIG. 11). The illustrated embodiment of the pump assembly 3100 does not include a support flange engaged with the seal 3310. Rather, as illustrated in FIG. 12, the seal 3310 includes a plurality of inwardly extending projections 3311 that are received in corresponding recesses 3312 formed in the bottom end of the upper pump assembly 3306 to couple the inner end of the seal 3310 to the upper pump assembly 3306. The outer end of the seal 3310 includes a plurality of hook-shaped projections 3313. The projections 3313 engage an edge of the lower casing 3102 to couple the outer end of the seal 3310 to the lower casing 3102.

The seal 3310 is made of a flexible material, such as rubber, silicone, other resilient elastomeric materials, or the like. As such, the seal 3310 provides a vibration-isolating or dampening connection between upper pump assembly 3306 and the casings 3101, 3102.

Various features and aspects of the present disclosure are set forth in the following claims.

What is claimed is:

1. A pump assembly comprising:
a pneumatic pump including a body having a discharge passage, the pneumatic pump operable to discharge compressed air through the discharge passage;
a casing at least partially surrounding the pneumatic pump, the casing including a casing outlet passage, a first casing portion, a second casing portion, and a seal sandwiched between the first casing portion and the second casing portion; and
a tube fluidly connecting the discharge passage and the casing outlet passage,
wherein the pump assembly is configured such that the compressed air flows through the discharge passage and into the tube prior to being discharged from the casing through the casing outlet passage,
wherein the tube is linear and positioned between an end of the pneumatic pump and the casing to define a first vibration-isolating connection between the pneumatic pump and the casing, and
wherein the seal defines a second vibration-isolating connection between the pneumatic pump and the casing.

2. The pump assembly of claim 1, wherein the tube extends along a longitudinal axis of the pump assembly.

3. The pump assembly of claim 2, wherein the body is at least partially disposed within the first casing portion, and wherein the pump assembly further comprises a motor at least partially disposed within the second casing portion, the motor operable to drive the pneumatic pump.

4. The pump assembly of claim 3, further comprising a motor mount, wherein the motor mount is positioned between the second casing portion and the motor, and wherein the motor mount defines a third vibration-isolating connection between the motor and the casing.

5. The pump assembly of claim 4, wherein the pneumatic pump and the motor are supported within the casing by only the seal, the tube, and the motor mount.

6. The pump assembly of claim 4, wherein the first vibration-isolating connection, the second vibration-isolating connection, and the third vibration-isolating connection are spaced apart in a direction along the longitudinal axis of the pump assembly.

7. The pump assembly of claim 4, wherein the tube, the seal, and the motor mount are each made of a resilient material.

8. The pump assembly of claim 1, wherein the seal includes a plurality of projections, and wherein the pump assembly includes a plurality of recesses in which the projections are received.

9. The pump assembly of claim 8, wherein the seal includes a hook engaged with an end of the second casing portion.

10. The pump assembly of claim 1, wherein the body includes a first fitting, wherein the casing includes a second fitting, and wherein the tube extends between the first fitting and the second fitting.

11. The pump assembly of claim 1, wherein the tube is made of a resilient material.

12. The pump assembly of claim 1, wherein the discharge passage, the casing outlet passage, and the tube are coaxial.

13. The pump assembly of claim 1, further comprising an elastomeric member disposed between the tube and one of the discharge passage or the casing outlet passage.

14. The pump assembly of claim 13, wherein the elastomeric member is an o-ring.

15. A pump assembly having a longitudinal axis, the pump assembly comprising:
a casing including a casing outlet passage;
a pneumatic pump disposed within the casing and having a discharge passage operable to discharge compressed air;
a tube fluidly connecting the discharge passage and the casing outlet passage, wherein the compressed air flows from the discharge passage through the tube prior to being discharged from the casing outlet passage;
a motor disposed within the casing, the motor operable to drive the pneumatic pump; and
a motor mount positioned between the casing and the motor, wherein the tube defines a first vibration-isolating connection between the pneumatic pump and a first end of the casing, and wherein the motor mount defines a second vibration-isolating connection between the motor and a second end of the casing opposite the first end, wherein the motor mount has a body that is coaxial with and surrounds the longitudinal axis such that the body is configured to provide vibration isolation in a radial direction perpendicular to the longitudinal axis.

16. The pump assembly of claim 15, wherein the tube and the motor mount are each made of a resilient material.

17. The pump assembly of claim 15, wherein the pneumatic pump and the motor are collectively supported within the casing by the tube and the motor mount.

18. The pump assembly of claim 15, further comprising a resilient member disposed between the tube and one of the discharge passage or the casing outlet passage.

19. A pump assembly comprising:
a casing including a casing outlet passage;
a pneumatic pump within the casing and having a discharge passage operable to discharge compressed air, wherein the discharge passage is in fluid communication with the casing outlet passage;
a motor having a longitudinal axis and disposed within the casing and operable to drive the pneumatic pump, wherein a first end of the motor is disposed adjacent a first end of the pneumatic pump;
a first resilient support positioned adjacent the first end of the pneumatic pump and adjacent the first end of the motor, wherein the first resilient support extends between the pneumatic pump and the casing; and
a second resilient support extending between the motor and the casing, wherein the second resilient support is positioned adjacent a second end of the motor opposite the first end of the motor, and wherein the second resilient support has a body that is coaxial with the longitudinal axis and engages a central portion of the bottom of the motor, wherein the first resilient support defines a first vibration-isolating connection between the pneumatic pump and the casing and between the motor and the casing, and wherein the second resilient support defines a second vibration-isolating connection between the motor and the casing, and wherein the first and second resilient supports are coaxial and collectively support the pneumatic pump and the motor within the casing.

20. The pump assembly of claim 19, wherein the pneumatic pump and the motor are supported within the casing by only the first and second resilient supports.

21. The pump assembly of claim 19, further comprising a third resilient support extending between the pneumatic pump and the casing, wherein the third resilient support is positioned adjacent a second end of the pneumatic pump opposite the first end of the pneumatic pump, and wherein the pneumatic pump and the motor are supported within the casing by only the first, second, and third resilient supports.

22. The pump assembly of claim 21, wherein the third resilient support comprises a tube fluidly connecting the discharge passage and the casing outlet passage, and wherein the compressed air flows from the discharge passage through the tube prior to being discharged from the casing outlet passage.

23. The pump assembly of claim 22, further comprising a resilient member disposed between the tube and one of the discharge passage or the casing outlet passage.

24. The pump assembly of claim 21, wherein the first, second, and third resilient supports are each formed as an elastomeric member.

25. The pump assembly of claim 19, wherein the casing comprises a first casing portion and a second casing portion, and wherein the first resilient support comprises a seal positioned between the first casing portion and the second casing portion, and wherein the second resilient support comprises a motor mount positioned between the second casing portion and the motor.

* * * * *